United States Patent Office 3,499,112
Patented Mar. 3, 1970

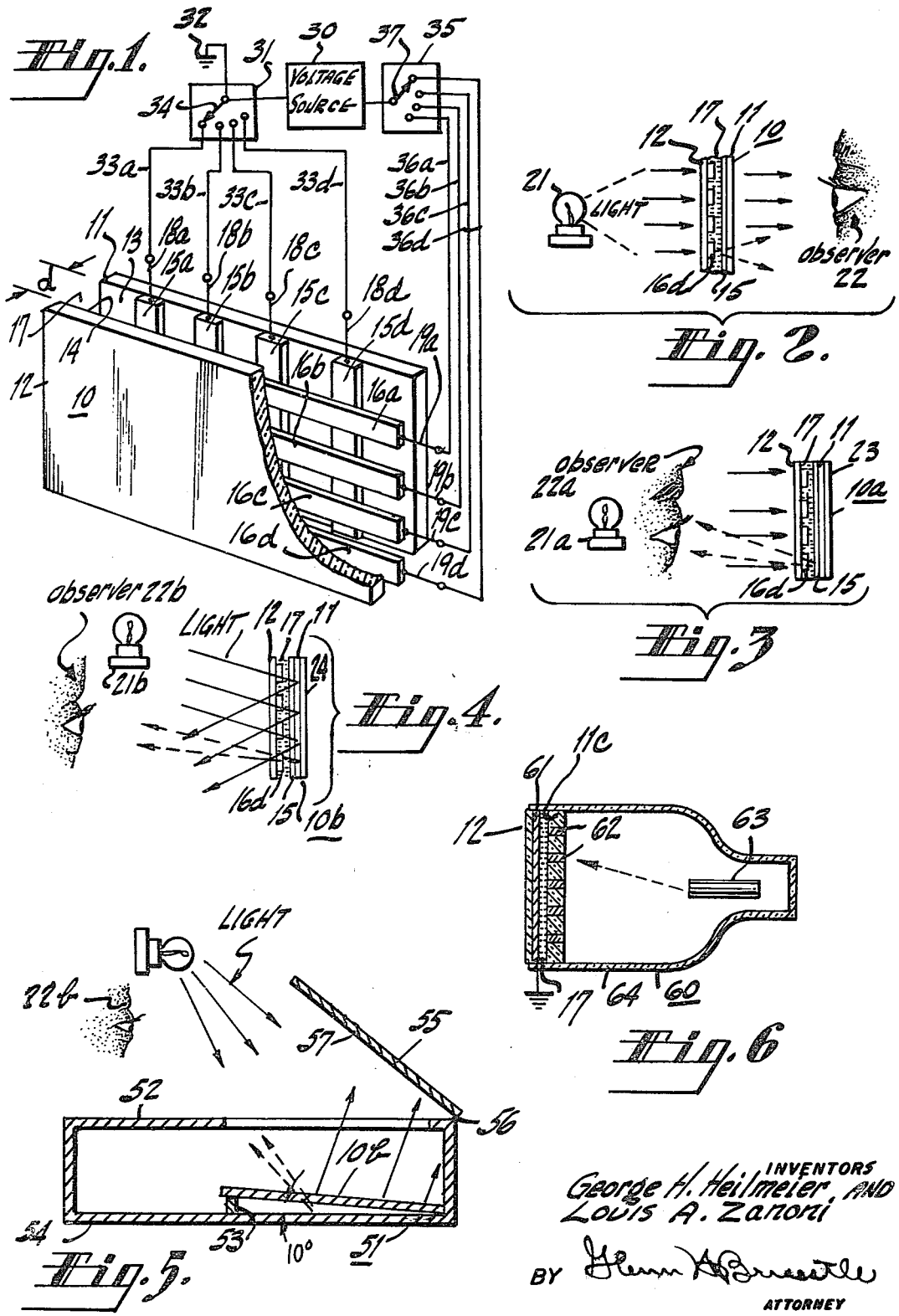

3,499,112
ELECTRO-OPTICAL DEVICE
George H. Heilmeier, Philadelphia, Pa., and Louis A. Zanoni, Trenton, N.J., assignors to RCA Corporation, a corporation of Delaware
Filed Mar. 31, 1967, Ser. No. 627,515
Int. Cl. H04n 3/16; G02f 1/28
U.S. Cl. 178—7.7                14 Claims

ABSTRACT OF THE DISCLOSURE

An electro-optical display device having a layer of a nematic liquid crystal composition of a type that scatters light due to turbulence in the layer created by the application of a voltage across the layer, which voltage is accompanied by a current in the layer, means for supporting the layer, and means for applying a voltage across the layer of a magnitude sufficient to cause turbulence of the layer in the region of the applied voltage.

Background of the invention

This invention relates to improved electro-optical devices useful for application which involve the modulation of light, such as optical display devices. The invention particularly relates to novel nematic liquid crystal electro-optical devices.

Nematic liquid crystal electro-optical devices are known in the art. These prior art devices operate by rotation and orientation of domains or clusters of the optically anisotropic nematic medium upon the application of an electric or magnetic field. This orientation is a field effect phenomenon and does not require current flow. According to prior art teachings, the rotation and orientation changes the light-transmitting and light-reflecting properties of the nematic medium, so that these devices may be used as light valves and for optical displays. An example of such a prior art device is given in patent application No. 236,546, filed by Richard Williams, now U.S. Patent No. 3,322,485.

The prior art devices described above have too low a contrast ratio and too slow a speed of response for many commercial applications. Typically, prior art devices operate in alternating fields of about $10^3$–$10^4$ v./cm. and have contrast ratios of from 2:1 to 3:1.

Summary of the invention

The novel devices are made possible by the discovery that layers of certain nematic liquid crystal compositions undergo or exhibit an essentially non-destructive turbulence when an electric current is caused to flow therein upon the application of a voltage to the layer. This turbulence, which is restricted to the region of the applied voltage, causes efficient scattering of light incident on that region. The degree of light scattering can be varied by varying the magnitude of the applied voltage between a threshold value necessary to initiate turbulence and a saturation valve above which there is little or no change in the degree of light scattering.

The degree of light scattering achieved when using nematic liquid crystal compositions which exhibit this effect, hereinafter called the dynamic scattering effect, is greater than that achieved when using materials as taught in the prior art in which an electric field causes rotation of domains or clusters of the nematic liquid. Display devices having this new effect have contrast ratios of up to greater than 20:1 and response speeds sufficient for commercial television applications.

The nematic liquid crystal compositions useful in the novel devices are characterized in that they exhibit turbulence upon the application of a voltage which produces a current flow in the composition. The preferred nematic compositions are high purity materials having resistivities in the range of about $10^8$ to $10^{11}$ ohm-centimeters in their nematic state. Impure liquid crystal compositions wherein the resistivities are reduced to below $10^8$ due to the impurities therein are not performed in the novel devices. When in a pure form, the nematic materials thus far found to be useful in the novel devices do not exhibit domain rotation in an applied field as do prior art nematic materials. Likewise, the nematic liquid crystal compositions as used in the prior art do not exhibit the non-destructive turbulence effect as do the materials useful in the novel device.

The nematic liquid crystal composition should contain an excess of mobile ions therein to provide the current flow between electrodes in the novel devices. The ions may be permanently present in the liquid crystal composition or they may be induced by injection of electrons from the cathode upon the application of a sufficiently high voltage. The term excess of mobile ions includes: (1) a net difference in the number of negative ions as compared to the number of positive ions; (2) a preferential absorption of ions of one polarity on the surface of the supporting structure or elsewhere so that ions of opposite polarity are substantially responsible for the current flow in the device; and (3) a very large difference in transport numbers of ions of one polarity as compared to ions of opposite polarity so that the current flow in the device is substantially due to that ion having the highest transport number. The net difference in the number of ions of one polarity compared to the number of ions of opposite polarity may, for example, be caused by injection of electrons into the liquid crystal medium followed by capture of the electron by a neutral molecule so as to provide a negative ion.

The novel devices are comprised of a layer or film of a nematic liquid crystal composition. This liquid crystal layer is of the type that exhibits essentially non-destructive turbulent motion upon the application of a voltage which produces an electric current in the layer. The device also includes means for supporting the layer, and means for applying a voltage to the layer. The last named means additionally produces an electric current flow in the liquid crystal layer sufficient to cause turbulence of the layer in the region of the field associated with the applied voltage.

The theory of operation of the novel device is not fully understood and is presented herein merely to attempt to add an understanding of the nature of operation of these devices. It should be noted that the novel devices disclosed herein are not to be limited by the presentation of the proposed theory.

There are several mechanisms by which an electric field can exert a force on a fluid. These mechanisms include for example, electro-restriction, spacially varying dielectric constant, dielectrophoresis, electrophoresis and electrohydrodynamic effects. It is believed that the turbulence produced in the novel devices upon the production of a sufficiently strong electric field is due to electrohydrodynamic effects. These effects are due to mechanical forces which are produced by unipolar electrical conduction. For example, when ions in a partly ionized medium move under the influence of an electric field, friction or collisions with molecules of the carrier medium transfer momentum to the latter. If essentially only one polarity of ion is present, the pressures created by this effect can be significant.

Experimental evidence leads to the hypothesis that application of an electric field or voltage to the device causes turbulence of the liquid crystal molecules by first causing the mobile ions present in the liquid crystal composition to gain momentum. This momentum is then transferred to neutral molecules, of substantially the same mass as the ions, by direct collision or by non-uniform shear in regons of overlapping double layers or neutralizing charge clouds which are believed to surround the mobile ions. These double layers are neutralizing charge clouds may be likened to the well known Helmholtz double layers. Alternatively, they may be described as an essentially charge free region surrounding an ion in which the potential energy of a polar or polarizable molecule in the field of the ion is greater than or equal to the thermal energy. It is also possible that the non-uniform field pattern produced by the mobile ions impart motion to the neutral molecules. The turbulent motion thus caused in the region of the applied field results in the scattering of light incident on that region. The optional effect as seen by a viewer observing the light passing through or reflected from the turbulent region is one of a change in brightness due to the light scattering in that region.

It should be noted that the turbulent motion is non-destructive in nature. That is, the turbulence is not due to a destructive or lossy phenomenon such as boiling or dielectric breakdown of the liquid crystal medium.

Experimental evidence upon which this hypothesis is based includes: the variation of rise and decay time of the light scattering effect as a function of conductivity of the nematic liquid crystal composition; the dependence of the effect upon electrode polarity and the electron injection characteristics of the cathode when a D.C. field is used; the anomalous behavior observed when the film thickness approaches the Debye length of the ions; the initiation and propagation of the field-induced optical effect from the cathode; the low pressure at the cathode as compared to the pressure at the anode when a field is applied; and the necessity for current flow for the optical effect to be observed.

Brief description of the drawings

In the drawings:

FIGURE 1 is a perspective, partially cut-away view of an electro-optical display device embodying the invention, and a schematic representation of a circuit for operating the device;

FIGURE 2 is a sectional elevational view of the transmissive mode of use of the device shown in FIGURE 1;

FIGURE 3 is a sectional elevational view of the absorptive mode for use of the device shown in FIGURE 1;

FIGURE 4 is a sectional elevational view of the reflective mode of use of the device shown in FIGURE 1;

FIGURE 5 is a sectional elevational view of a device mounted to have high contrast ratio;

FIGURE 6 is a sctional elevational view of the device scanned by an electron beam;

Description of the preferred embodiment

Figure 7:
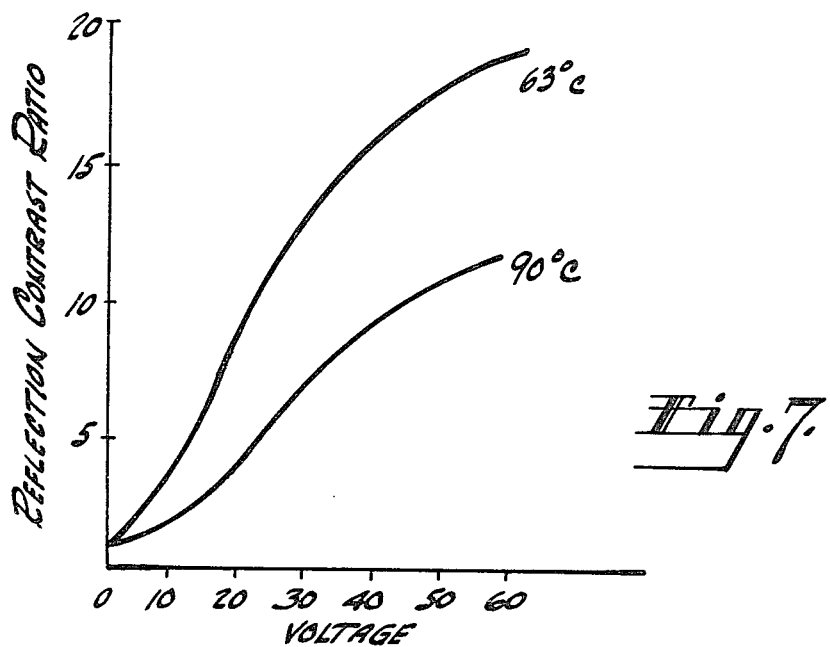
FIGURE 7 is a graph of reflection contrast ratio versus D.C. voltage for showing the effect of the magnitude of an applied D.C. voltage upon the contrast ratio.

FIGURE 1 illustrates a novel crossed grid optical display device 10. The novel device 10 is comprised of back and front transparent glass support plates 11 and 12 respectively. The two plates 11 and 12 have essentially parallel inner faces 13 and 14 respectively that are separated by a distance $d$, which is generally in the range of about 5 to 30 microns. The back plate 11 supports, on its inner face 13, an array of parallel spaced transparent conductive back electrode strips 15a, 15b, 15c and 15d. In this example, only four back strips (15a, 15b, 15c and 15d) are shown; but a much larger number of electrode strips may be used. The front plate 12 supports, on its inner face 14, an array of parallel, spaced transparent conductive front electrode strips 16a, 16b, 16c and 16d. The front strips 16 are positioned so that their longitudinal directions are substantially perpendicular to the longitudinal direction of the conductive back strips 15. Again, only four front strips (16a, 16b, 16c and 16d) are shown, but a much larger number may be used.

The space between the back and front plate 11 and 12 is filled with a medium so as to form a film 17. The film 17 is comprised of a nematic liquid crystal composition of the type that exhibits turbulent motion upon the application of a voltage which produces an electric current in the film, for example, a film comprised of anisylidene-p-aminophenylacetate, having an excess of mobile ions therein. The film 17 is a weak electrolyte.

The device 10 includes connection means 18a to 18d and 19a to 19d for applying a voltage to the conductive back electrodes 15a to 15d and to the conductive front electrodes 16a to 16d, respectively. As used herein, said connecting means and/or said conductive strips are included in the means for applying the electric field or voltage to the liquid crystal layer.

FIGURE 1 also includes a schematic representation of a circuit for operating the display device 10. The circuit includes a back strip commutator switch 31 having its common contact connected to one side of a voltage source 30 and to ground 32. A plurality of commutator contacts of the switch 31 are conected to the back strip connecting means 18a to 18d through leads 33a to 33d. Also, a front strip commutator switch 35 is provided which has a plurality of commutator contacts connected to the front strip connecting means 19a to 19d through leads 36a to 36d and a common contact connected to the other side of the voltage source 30.

In a transmissive mode of operation, as shown in FIGURE 2, a light source 21 is positioned on one side of the device 10 so that light is directed through the device in a direction substantially normal to the major faces of the plates 11 and 12. The observer 22 is on the opposite side of the device 10 from the light source 21. At less than a threshold field, the observer 22 sees the entire plate area as uniformly bright. When a voltage of sufficient magnitude is applied between a back electrode strip, and a front electrode strip, such as, for example, between electrode strips 15a and 16d via the connecting means 18a and 19d respectively, the film 17 in the volume defined by the intersection of the energized electrode strips is affected by the voltage and current caused to flow in it due to the applied voltage. This voltage and current flow causes turbulence in the film in this volume and gives rise to scattering of light incident on that portion of the device. The observer sees this region of his field of view become darker than the remaining plate area due to the light scattering. The threshold voltage required to obtain this effect is generally in the range of $0.5 \times 10^4$ to $1 \times 10^4$ volts per centimeter of film thickness. Too high an applied voltage can cause unwanted dielectric breakdown of the liquid crystal medium. The applied voltage can be for example A.C., D.C. or pulsed D.C.

By sequentially energizing more than one electrode strip from each set, a plurality of predetermined areas are thus darkened. Scanning techniques known to the mural television art may be utilized to sequentially and cyclicly energize the conductive strips and to modulate the amplitude of the voltage source. In this manner various types of information may be optically displayed. Furthermore, by having a large number of closely-spaced electrode strips on each plate, for example electrode strips that are on the order of 1 mil wide and spaced ½ mil apart, a picture can be displayed on a device of this type. Also, the percent of light scattered and hence the degree of darkening for each element can be modulated by controlling the magnitude of the applied voltage above the threshold, thereby affording a grey scale. Alternatively, a display can be generated by simultaneously energizing a plurality of selected electrode strips.

In the above optical display device, operation is achieved by modulation of light transmission as illustrated in FIGURE 2. Alternatively, operation can be achieved by modulation of light reflection or light absorption. In an absorptive mode of operation, a device 10a, as illustrated in FIGURE 3 is used. The device 10a differs from the device 10 in that one support plate, e.g., the back plate 11, is coated with a layer of a dark material 23 so that light passing through the transparent plate 12 and the nematic liquid crystal layer 17 is absorbed at the darkened plate 11. Alternatively the back plate may itself be of dark colored composition. A light source 21a and a viewer 22a are both disposed on the transparent plate side of the device 10a. When there is no voltage across an electrode of the group 15a through 15d and an electrode of the group 16a through 16d, the surface of the device appears dark to the viewer as essentially all of the light is absorbed by the dark plate 11 and only a small quantity of light is reflected back to the viewer. When a voltage above the threshold voltage is applied across any of said electrode pairs, for example electrodes 15a and 16d, some of the light at the intersection of these electrodes is caused to be reflected by the liquid crystal layer 17 and appears as a bright area to the viewer. In this mode of operation, the percent of light reflected is modulated by the magnitude of the applied voltage. Also, the brighter the source light or ambient the brighter the reflected image. This mode of operation is the least efficient and least desirable since about 90% of the light is forward scattered by the turbulent liquid crystal layer rather than back scattered. Hence, most of the light continues in the same general direction as prior to scattering and is absorbed on the dark surface.

The preferred mode of operation is the reflective mode and uses a device 10b as illustrated in FIGURE 4. Here, one support plate of the device 10b, e.g., the back plate 11, is made reflective rather than absorbing, for example by a specularly reflective coating 24 on the outer face of the plate 11. In the reflective mode of operation, a light source 21b and a viewer 22b are both positioned on the transparent plate side of the device 10b. The light source 21b, preferably but not necessarily, produces a collimated beam at such an angle that the light reflected from the reflective coating 24 does not strike the viewer 22b. When a voltage is applied across the electrodes of the device as previously described, light will be scattered in the region of the electrode intersection causing some of the light to be observed by the viewer. This mode is more efficient than the absorbing mode since, here, the forward scattered light is reflected bcak to the viewer so as to give a brighter image.

A variety of transparent solids may be utilized for a transparent support plate, including the various types of glass, fused quartz, transparent corundum, and transparent plastics and resins. A non-transparent support plate may be made from the same materials as the transparent plate coated with a material, such as a black organic dye for absorption or a metallic film for specular reflection:

The transparent conductive strips may be made, for example, by depositing thin layers of indium oxide or stannic oxide on the desired region of the plates 11 and 13. The conductive strips on the light-absorbing or light-reflecting support plate need not be transparent and may, for example, be a film of copper, aluminum, chromium or nickel. When a D.C. applied field is used, it is preferable that the negative electrode be a good electron injector, such as a metal. The preferred electrode materials are films of nickel, cobalt, aluminum, and transparent tin oxide, nickel and cobalt being especially useful as cathodes. The conductive strips 15a to 15d and 16a to 16d should be in contact with the liquid crystal film 17 so as to permit a current to flow therethrough. It is also possible to use conductors running through the support plates; for example, wires embedded in the support plates, or conductive plugs forming an integral part of the support plate. Alternatively, in some applications, the voltage may be applied between parallel electrodes rather than crossed electrodes.

The spacing between the support plates may be maintained in any one of several ways. For example, by means of shims, clamps, or a suitable frame-like holder.

In operation, the device is maintained at a temperature at which the nematic-liquid crystal composition is in its mesomorphic state. If heating is required, this can be done by external heaters; for example, infra-red heat lamps or heating coils in close proximity to the device. Alternatively, this can be accomplished by having transparent resistive layers on the outer faces of the support plates across which voltage is applied so that the power dissipated in these layers heats the device. It is preferable to heat the devices to temperatures somewhat above the crystal-nematic transition temperature because, when they are operated at or about the transition temperature, the response of the liquid crystal layer is slower than at higher temperatures in the mesophase. Also, the contrast ratio may be reduced at near transition temperatures due to the presence of light scattering in the absence of a field.

It was additionally discovered that in order to obtain the maximum contrast ratio of a device operated in the reflective mode and employing ambient or other non-collimated light as the light source, it is preferable to have the face of the device "look-into" a black or light absorptive background. That is, the device should be at an angle such that most of the unscattered light striking the device will be reflected into a light absorbtive background. In this way the surface of the device will appear dark except in the region where scattered light is reflected back to the viewer. This region appears as a light spot having high contrast to the surrounding dark areas. Also, in order to eliminate annoying mirror-like reflections of the surrounding area, the front support plate or a separate cover plate should be made with a lightly frosted surface so as to diffuse the ambient to an extent such that the mirror-like reflections are eliminated.

FIGURE 5 illustrates an embodiment of a package for the device 10b employing the above arrangement. The package is comprised of a box 51 having a length of about 6¾ inches, a width of about 4 inches, and a depth of about 1⅝ inches. The box 51 is completely closed except for about a 2½ inch by 2½ inch area cut out of the front face 52 of the box. This area is located about 1 inch from a top edge and ¾ of an inch from each side of the front face 52. A 3 inch by 3 inch reflective display device 10b is mounted within the box 51 opposite, and in line with the opening defined by the cut-out area of the front face 52. The device 10b is mounted by means of a support member 53 attached to the back portion 54 of the box 51, so that the device 10b makes an angle of about 10° with the front face 52 of the box 51. A lid 55 is pivotally mounted to the top edge of the box 51 by means of a hinge 56. The inner face of the lid 57 is black. When the lid is raised to an appropriate position, most of the light from the ambient light source 21b, for example, strikes the reflective device 10b, and, when no voltage is applied to the device 10b, the light is reflected onto the dark inner face 57 of the lid 55, causing the device to appear dark to the viewer 22b. When a voltage is applied across a given region of the device 10b, a portion of the light incident on that region is scattered and reflected back to the observer 22b, causing that segment to appear bright as compared to the adjacent regions having no voltage thereacross.

Still another embodiment of the novel device is illustrated in FIGURE 6. Here the voltage across the film 17 is generated by the charge deposited by an electron beam which is scanned in the same manner as in a TV system. The beam supplies charge to a selective conducting area in contact with the film 17. This charge establishes the activating voltage across the film 17 in that area. The charge is drained in a frame time by injection into the liquid crystal layer where it combines with a neutral molecule to form a mobile anion. The mobile anion is discharged when it reaches the anode.

The device is comprised of a front support plate 12 having an electrically grounded transparent conductive layer 61 on one major surface thereof. A back support plate 11c is spaced from and essentially parallel to the front support plate 12. The back support plate 11c includes a plurality of holes therein and a conductor, such as conducting epoxy resin plugs 62, filling said holes. The epoxy resin plugs are preferably coated with evaporated aluminum. A film 17 as previously described fills the space between the back and front support plates and is in contact with the transparent conductive layer. The device also includes means for electron beam scanning the back support plate, such as a conventional electron beam gun 63. Instead of conductive epoxy plugs, metal wires can be embedded in the back support plate. It is also necessary to provide an evacuated envelope 64 around the back support plate 11c and the electron gun 63.

The electron beam scanning system can be made into a color system by using a backing which selectively reflects a particular primary color. For example, the plugs may be arranged in a triad dot configuration wherein the surface of the plugs in contact with the film have a conductive layer, for example an aluminum layer thereon, and wherein said aluminum layer is treated with a dye to selectively reflect one of the primary colors, each dot in a triad reflecting a different primary color. Alternatively, the front support plate which selectively transmits a particular primary color may be used to obtain a color display. The device can then be scanned by a standard three color gun, such as the type employed in conventional shadow mask color TV tubes. The triad structure or selective transmitting support plate structure described above can also be used for producing a color display with scanning techniques other than electron beam scanning, for example, matrix scanning.

A wide variety of liquid crystal compositions are useful in the novel electro-optical devices which operate by the dynamic scattering mode. Preferably, the nematic liquid crystal compositions have resistivities of between about $1 \times 10^8$ ohm-centimeters and $10^{11}$ ohm-centimeters. The resistivity necessary for any particular device depends upon the charge density and ion concentration of the film 17. A preferred class of liquid crystal compositions that have exhibited the non-destructive turbulence effect necessary for operation of the novel devices are Schiff bases having oxygen atoms bonded to the furthermost para positions of the aromatic rings of the compound.

The preferred film 17 is comprised of anisylidene-p-aminophenylacetate (hereinafter referred to as APAPA), having trace amounts of p,n-butoxybenzoic acid, (hereinafter referred to as BBA), therein. Although APAPA can be used without the BBA, it is somewhat milky and causes unwanted zero field reflection which thereby reduces the contrast ratio of the device. It was found that the addition of trace amounts of BBA substantially reduces this milky appearance. Contrast ratios of greater than 20:1 have been achieved in devices having a film comprised of APAPA and BBA and operated in the reflective mode. In order for the dynamic scattering effect to take place when the film is comprised of APAPA, it is believed that the charge density in the film should be less than a maximum of $(4\pi/3)^2(\epsilon\epsilon_0 kT/e^2)^3$, wherein $\epsilon$ is the relative dielectric constant of the liquid crystal composition $\epsilon_0$ is the dielectric constant of the liquid crystal composition in free space, $k$ is Boltzmans constant, $T$ is the absolute temperature and $e$ is the charge on an electron. All units are in the mks system. This maximum is based on a calculated thickness of the double layer or neutralizing cloud which is believed to surround the mobile ions in the film. The radius of the ion plus the double layer or charge cloud is the Debye length of the ion.

In operation, APAPA films require voltages in the order of 10 to 100 volts across a ½ mil film with operating temperatures in the range of 65° C. to 95° C. The light scattering typically has a two millisecond buildup and a 15 to 30 millisecond decay time in response to changes in electric field.

Other nematic liquid crystal materials useful in the novel devices include, but are not limited to, p-azoxyanisole, p-n-butoxybenzoic acid dimer, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylidene-p'-aminophenylpentoate and mixtures thereof. The resistivities of the above compounds are generally in the range between about $10^9$ to $5 \times 10^{10}$ ohm-centimeters except that high purity p-azoxyanisole has a resistivity of equal to or greater than $10^{11}$ ohm-centimeters. Devices having films using this ultra-pure p-azoxyanisole do not exhibit the dynamic scattering effect as is also the case with unpurified reagent grade p-azoxyanisole. However, the effect can be initiated by doping the pure p-azoxyanisole with ions, such as by dissolving small quantities of dodecylisoquinolium bromide in the p-azoxyanisole so as to reduce the resistivity of the film to less than $10^{11}$ ohm-centimeters but greater than $10^9$ ohm-cm. and to provide an excess of mobile ions in the film.

The novel devices are operable under either A.C., D.C. or pulsed D.C. voltages. Further, the ions in the film may either be introduced as dopants in the film or may be created in the film by the application of the voltage. In the latter case, the ions are believed to be produced by injection of electrons into the film, which electrons immediately combine with neutral liquid crystal molecules to form negative ions.

It is important for good operation and long life of the novel devices that the liquid crystal materials be purified at least until a reversible and constant nematic-isotropic liquid transition temperature is reached. This can generally be achieved by repeated recrystallization of the liquid crystal compounds. It is preferable to perform one additional recrystallization after a constant transition is reached, during which the solution is filtered through a filter having pores of about 0.2 micron.

The graph of FIGURE 7 is a plot of reflection contrast ratio versus applied D.C. voltage for a device having a ½ mil thick film of a mixture of p-n-anisylidene-p'-aminophenylacetate (APAPA), p-n-octoxybenzylidene-p'-aminophenylacetate, a silicon back electrode and a transparent conductive front electrode.

The change in contrast ratio with a change in applied voltage shows the grey scale control that is obtainable. A variation of contrast ratio and threshold voltage is also shown as a function of film temperature. For example, at an operating temperature of 63° C. this particular device has a contrast ratio of about 2 at a voltage of 4 volts and 19 at a voltage of 60 volts. The same device operated at 90° C. has a contrast ratio of about 1 at 4 volts and 11.5 at 60 volts.

Figure 8:
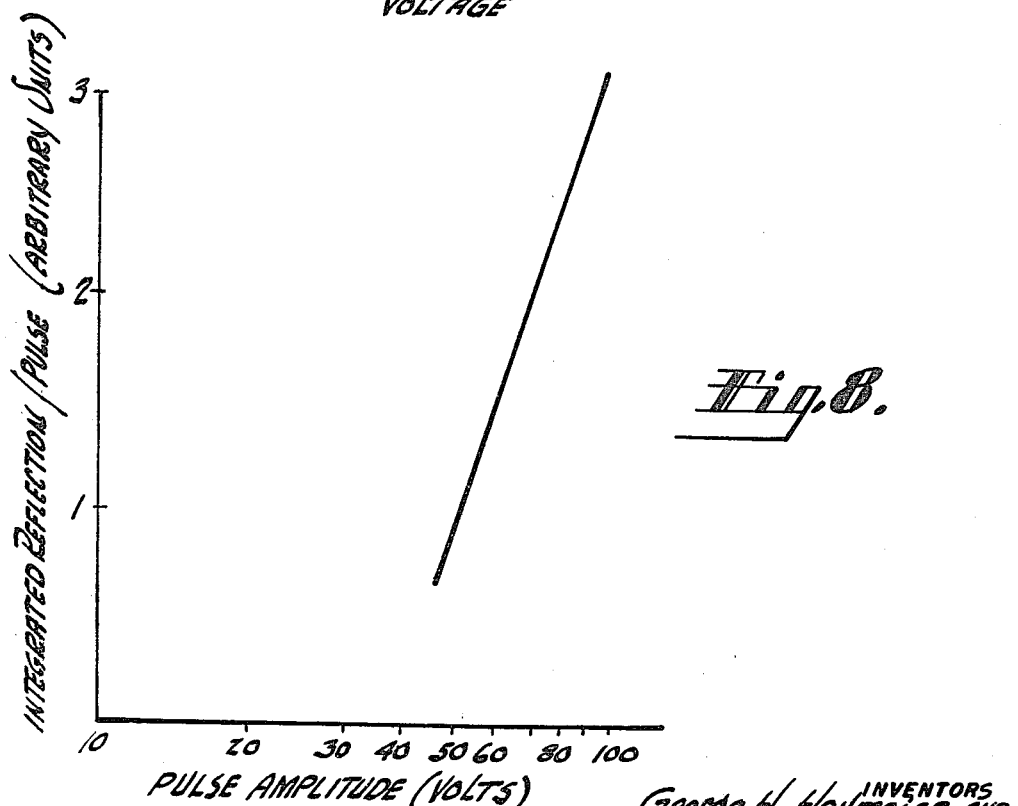
FIGURE 8 is a graph of integrated reflection versus pulsed voltage for showing the effect of a pulsed voltage upon the intensity of reflected light.

FIGURE 8 is a plot of integrated reflection per pulse versus the pulse amplitude of a device operated by a pulsed voltage rather than a steady D.C. voltage. The particular device was comprised of a ½ mil thick film comprised of p-n-octoxybenzylidene-p-aminophenylacetate having a resistivity of about $1.05 \times 10^{10}$ ohm-centimeters. The back electrode was chromium and the front electrode was a transparent tin oxide. Measurements were made using a 60 microsecond pulse at 15 pulses per second. The temperature of the device was 86° C. Under the above excitation a greater than threefold increase in the magnitude of the integrated reflection was achieved for a twofold increase in pulse amplitude. The pulse amplitudes used, varied from about 50 volts to 100 volts.

We claim:
1. An electro-optical device of the type which alters the scattering of light comprising
  (1) a nematic liquid crystal layer of the type that exhibits non-destructive turbulent motion upon the application of a voltage which produces an electric current in said layer, and
  (2) electrode means for applying said current producing voltage to said layer for causing said turbulent motion.

2. In the electro-optical device of the type described in claim 1 wherein said nematic liquid crystal layer has an excess of mobile ions therein and a resistivity in the range of about $10^{+8}$ to $10^{+11}$ ohm-centimeters.

3. In the electro-optical device of the type described in claim 2 wherein the improvement includes means for injecting electrons into said nematic liquid crystal layer to produce mobile anions therein.

4. In the electro-optical device described in claim 3 wherein the means for injecting electrons into said nematic liquid crystal layer comprises electrodes of a conducting material chosen from the group consisting of Ni, Co, Al and transparent tin oxide.

5. In the electro-optical device described in claim 2 wherein the thickness of said layer is between the Debye-length of said mobile ions in said film and about 30 microns.

6. In the electro-optical display device of the type described in claim 2 wherein said nematic liquid crystal layer comprises at least one compound of a class of Schiff bases having oxygen atoms bonded to the furthermost para positions of the aromatic ring.

7. In the electro-optical display device as described in claim 6 wherein said nematic liquid crystal layer comprises anisylidene-p-aminophenylacetate having a resistivity between about $10^8$ and $10^{11}$ ohm centimeters.

8. The electro-optical display device described in claim 7 wherein trace amounts of p,n-butoxybenzoic acid is included in the nematic liquid crystal composition.

9. In an electro-optical device as described in claim 1 including means for supporting said layer comprising essentially parallel support plates between which said layer is contained, at least one of said support plates being transparent and having a transparent conductive coating on at least one side thereof, and wherein said means for applying said voltage to said nematic liquid crystal layer includes said transparent conductive coating.

10. A reflective display device comprising
  (a) a layer of a nematic liquid crystal composition of the type that exhibits non-destructive turbulence upon the application of a voltage to said layer and electric current flow in said layer, when there is an excess of mobile ions therein,
  (b) an excess of mobile ions in said layer,
  (c) means for containing said film comprised of a transparent insulative front support plate, and an insulative back support plate, said support plates having inner major surfaces essentially parallel to and spaced less than 30 microns from each other, said back support plate including a surface reflective to light, said liquid crystal layer essentially filling said space between said support plates,
  (d) means for applying a voltage across said layer so as to cause electric current flow and turbulence in said layer in the region of the applied voltage, said means comprising (1) a first plurality of spaced transparent conductive electrode strips disposed adjacent the inner major surface of said front support plate, (2) a second plurality of spaced conductive electrode strips disposed adjacent the inner major face of said back support plate, said second plurality of spaced conductive electrode strips being substantially perpendicular to the direction of said first plurality of spaced conductive strips, (3) means including said first and second plurality of spaced conductive strips for applying said voltage across said liquid crystal layer.

11. The reflective display device described in claim 10 including (1) means for supporting said device and (2) a light-absorptive material positioned in relation to said device such that a substantial proportion of unscattered ambient light incident on the device is reflected onto said light-absorptive material and a proportion of ambient light scattered by the device is reflected away from said light-absorptive material so as to be capable of being seen by an observer.

12. An electro-optical display device comprising
  (a) a film of a nematic liquid crystal composition having an excess of mobile ions therein, said liquid crystal composition being of the type that exhibits turbulence upon the application of a voltage across said film, which voltage produces an electric current flow through said film,
  (b) means for containing said film comprised of transparent insulative support plates, said support plates having inner major surfaces essentially parallel to and spaced less than about 30 microns from each other, said liquid crystal film essentially filling said space between said support plates,
  (c) means for applying a voltage across said film comprising (1) a plurality of transparent spaced conductive electrode strips disposed adjacent the inner major surface of each of said support plates, the conductive strips on each support plate being essentially parallel to each other and being substantially perpendicular to the longitudinal direction of said conductive strips on the other of said support plate.

13. An electro-optical display device comprising
  (a) a film of a nematic liquid crystal composition having an excess of mobile ions therein, said liquid crystal composition being of the type that exhibits essentially non-destructive turbulence in the region of current flow across said liquid crystal film,
  (b) means for containing said film comprised of transparent front support plate having a transparent conductive surface in contact with said film, an insulative back support plate having a plurality of conductive paths running through said back support plate in a front to back direction, said support plates spaced less than about 30 microns apart and said film filling the space between said support plates,
  (c) means for scanning said plurality of spaced conductive paths with an electron beam so as to cause a current to flow in the film in the region near the conductive paths,
  (d) an evacuated envelope enclosing said scanning means and said back support plate.

14. A display device as described in claim 12 wherein said conductive paths are arranged in a plurality of regularly spaced triad configurations, and wherein the front surface of each conductor in a triad is reflective to a different primary color.

References Cited

UNITED STATES PATENTS

| | | | |
|---|---|---|---|
| 3,114,836 | 12/1963 | Fergason et al. | 250—83 |
| 3,322,485 | 5/1967 | Williams | 350—160 |
| 3,364,433 | 1/1968 | Freund et al. | 330—4.6 |
| 3,410,999 | 11/1968 | Fergason et al. | 250—43.5 |

JOHN W. CALDWELL, Primary Examiner

R. K. ECKERT, JR., Assistant Examiner

U.S. Cl. X.R.

23—230; 313—91; 350—160, 161